United States Patent [19]
Foster

[11] Patent Number: 5,647,234
[45] Date of Patent: Jul. 15, 1997

[54] VEHICLE LOCKING SYSTEM

[75] Inventor: Edward de Ferry Foster, Faringdon, England

[73] Assignee: Rover Group Limited, Birmingham, England

[21] Appl. No.: 492,392

[22] Filed: Jun. 19, 1995

[30] Foreign Application Priority Data

Jul. 2, 1994 [GB] United Kingdom .................. 9413388

[51] Int. Cl.$^6$ .................................................. B60R 25/00
[52] U.S. Cl. ........................... 70/256; 292/DIG. 25; 70/237
[58] Field of Search .............. 70/256, 257, 237, 70/238; 292/DIG. 25

[56] References Cited

U.S. PATENT DOCUMENTS

| 1,459,128 | 6/1923 | Wiseman | 70/238 |
|---|---|---|---|
| 1,724,424 | 8/1929 | Sandholdt, Jr. | 292/DIG. 25 |
| 1,857,654 | 5/1932 | Mylar | 70/256 |
| 1,880,135 | 9/1932 | Heath | 70/256 |
| 2,548,242 | 4/1951 | Rosenbarger | 70/256 |
| 4,612,729 | 9/1986 | Sato | 70/257 |
| 4,708,378 | 11/1987 | Ingenhoven | 70/257 |
| 5,052,204 | 10/1991 | Millar | 70/256 |
| 5,233,849 | 8/1993 | Forbers | 70/256 |
| 5,247,817 | 9/1993 | Körner et al. | 70/256 |
| 5,544,508 | 8/1996 | Torkowski | 70/264 |
| 5,546,777 | 8/1996 | Liu et al. | 70/257 |

FOREIGN PATENT DOCUMENTS

| 0009724 | 1/1984 | Japan | 292/DIG. 25 |
|---|---|---|---|
| 2026657 | 2/1980 | United Kingdom . | |

*Primary Examiner*—Darnell M. Boucher
*Attorney, Agent, or Firm*—Davis and Bujold

[57] ABSTRACT

A vehicle door latch has a latching mechanism operated by longitudinal movement of the inner of a Bowden cable via a lever. The latch also has a locking mechanism operated by rotation of the cable inner. The longitudinal movement of the cable inner is effected by means of the external door handle, and the rotational movement by means of the key operated door lock.

12 Claims, 4 Drawing Sheets

VEHICLE LOCKING SYSTEM

FIELD OF THE INVENTION

The present invention relates to locking systems for vehicles, and in particular to improved mechanical drive mechanisms for vehicle locks.

BACKGROUND TO THE INVENTION

With ever increasing car crime it is becoming more important to provide locking systems for vehicles which prevent unauthorized access to the vehicle. Currently the link between the door lock into which the key is inserted and the latch mechanism which is to be locked is generally made up of link rods. It is a problem with such systems that once a thief has forced the lock out of the door it is easy to operate the latch manually by direct access to the link rods. Also the link rods can be operated by inserting an implement down the side of the window glass.

The present invention aims to overcome this problem by providing a more secure link between the lock and latch.

SUMMARY OF THE INVENTION

Accordingly the present invention provides a securing system for a vehicle door, the system comprising a rotatable drive member adapted to be rotated by a user of the vehicle, a cable link comprising a cable outer and a cable inner having a longitudinal central axis and first and second, securing mechanism for securing a door of the vehicle, wherein the cable inner is rotatable about said axis within the outer by movement of the rotatable drive member to operate the first securing mechanism and movable longitudinally within the cable outer to operate said second mechanism.

Preferably the first securing mechanism comprises a locking mechanism. This can be a key operated lock, and the rotatable drive member may form part of said lock.

Preferably the rotatable drive member includes a first gear wheel, and the system further comprises a second gear wheel attached to the cable inner and engaged with the first gear wheel to be rotated by it. The gear wheels are preferably bevelled and have respective axes of rotation which are perpendicular to each other.

The rotatable drive member may be arranged to be rotated directly by hand, and may, for example comprise a thumb wheel.

Preferably the securing mechanism one of the first and second mechanisms, is a lock and the other is a latch mechanism.

Preferably the rotatable drive member has splines thereon, and the system further comprises a splined sliding member which can slide relative to the drive member to allow the longitudinal movement of the cable inner.

The system preferably further comprises a longitudinal drive member which is rotatably attached to the cable inner.

BRIEF DESCRIPTION OF THE DRAWINGS

FIG. 1A is a schematic view of part of the system of FIG. 1;

DESCRIPTION OF THE PREFERRED EMBODIMENTS

Figure 1:
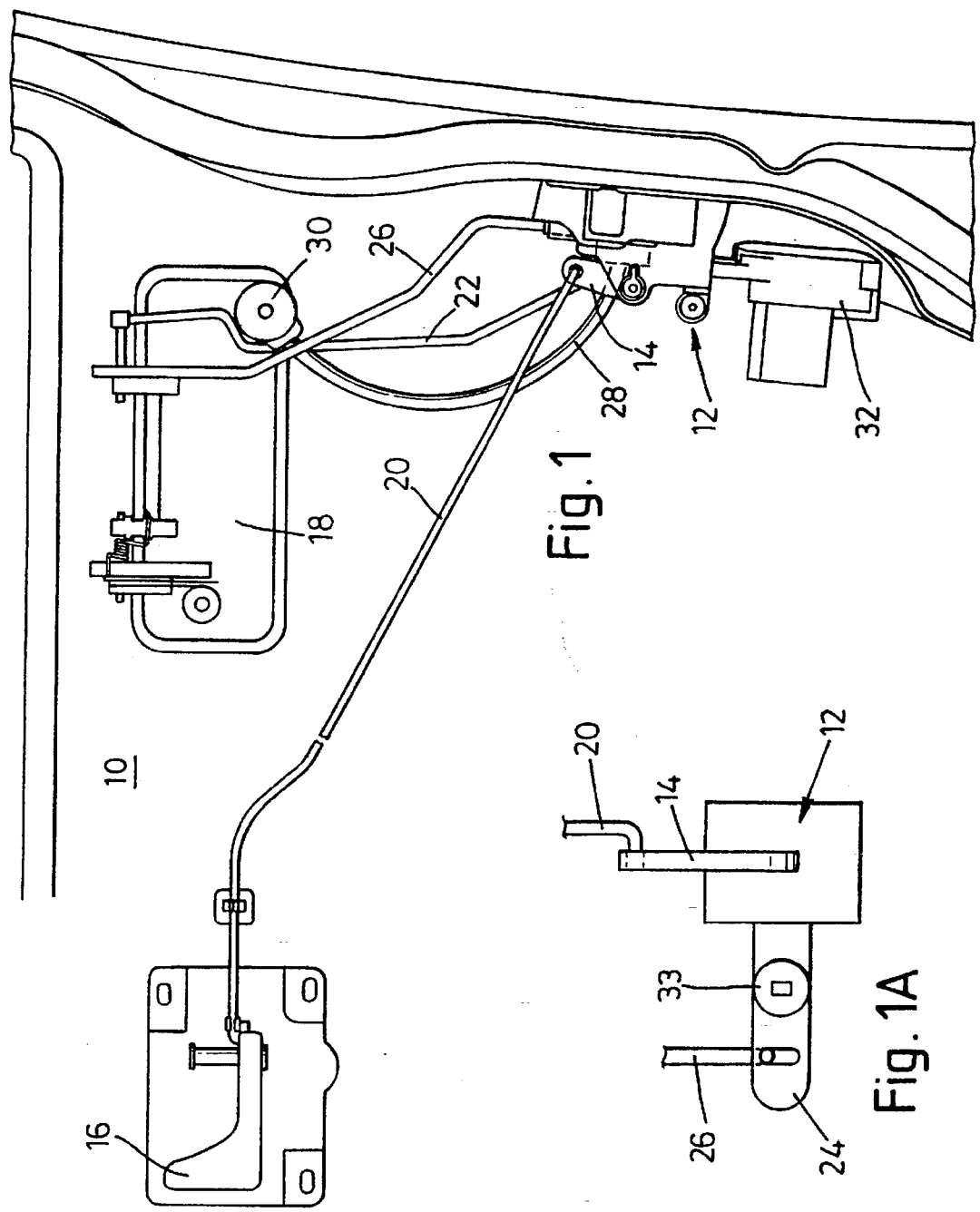
FIG. 1 is a view of a vehicle door securing system according to a first embodiment of the invention.
Figure 2:
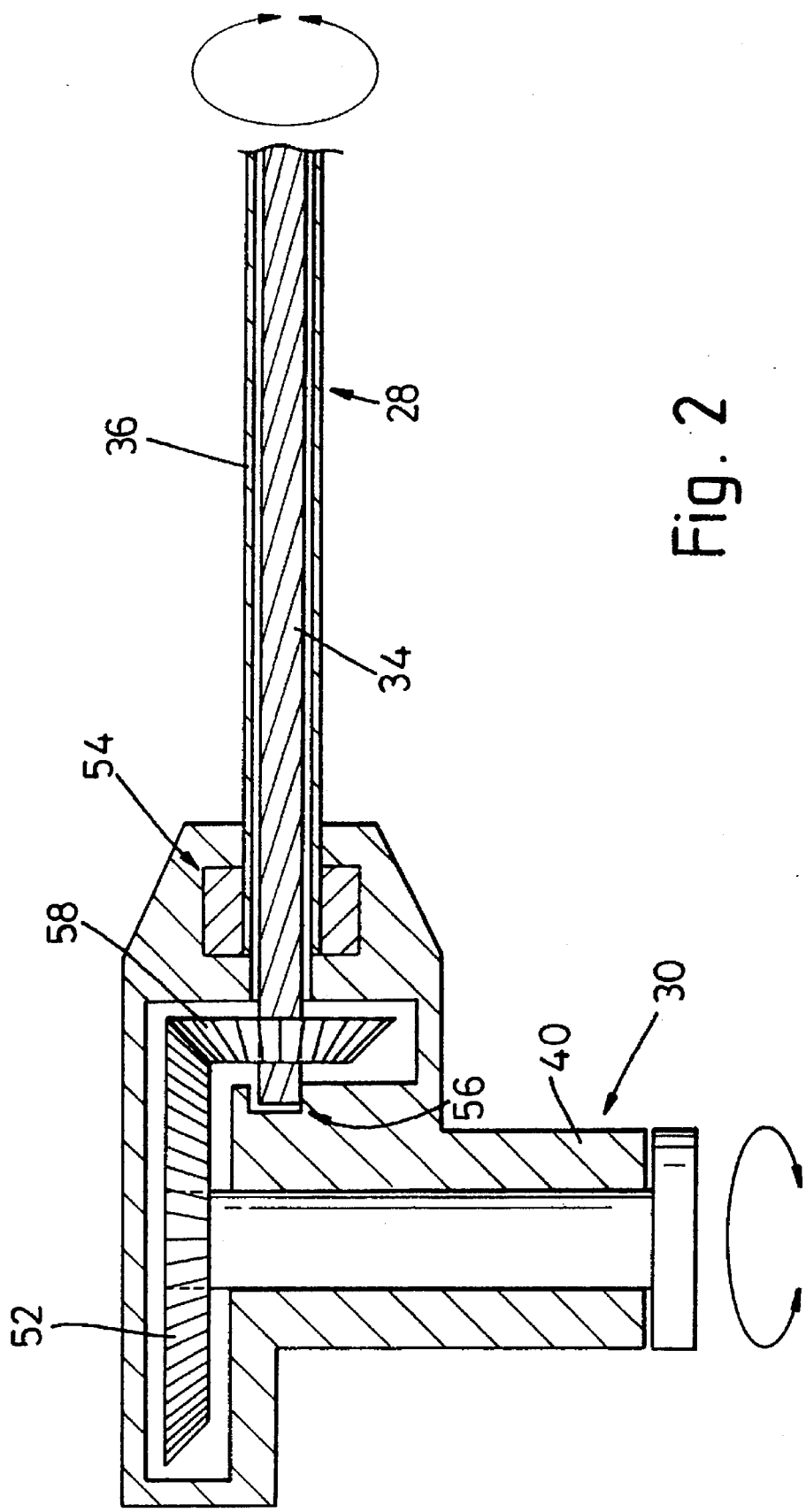
FIG. 2 is a section through the door lock of the system of FIG. 1.

Referring to FIGS. 1 and 2 a vehicle door 10 has a latch mechanism 12 mounted on it. The latch mechanism includes an unlatching or release lever 14 which is used to unlatch the door 10 and is connected to inside and outside door handles 16, 18 by respective link rods 20, 22. The latch mechanism further includes a locking lever 24 which operates a locking function within the latch mechanism 12. The locking lever can be operated by a link rod 26 connected to a sill button (not shown) on the vehicle door 10, by a Bowden cable 28 connected to a key operated external door lock 30, and by a central locking motor 32. The Bowden cable 28 has its inner 34 connected to the locking lever by means of a screw-in connector 33 which translates rotation of the inner 34 in the Bowden cable outer 36 to rotation of the locking lever.

As can be seen in FIG. 2, the door lock 30 includes a first bevelled gear 52 arranged to rotate when the key is turned in the lock. The Bowden cable outer 36 is supported in a cable abutment 54, and the inner 34 extends into the casing 40. The casing includes a support 56 for the end of the inner 34 which allows it to rotate but prevents lateral movement. Between the abutment 54 and the support 56 a second bevelled gear 58 is mounted on the cable inner 34, such that it engages the first bevelled gear 52. Therefore rotation of the key in the lock causes rotation of the Bowden cable inner 34. The axis of rotation of the key and the first bevelled gear 52 is perpendicular to that of the second bevelled gear 58 and the cable inner 34.

The casing 40 completely encloses the door lock and all the components which translate rotation of the key in the lock to rotation of the Bowden cable inner. Also the casing 40 and the Bowden cable outer 36 prevent access to the Bowden cable inner 34 by any route other than via the door lock 30. This means that even if a potential thief manages to prise the lock 30 out of the vehicle door 10 he will still not have access to the Bowden cable inner 34, and will therefore not be able to operate the locking lever easily.

Figure 3:
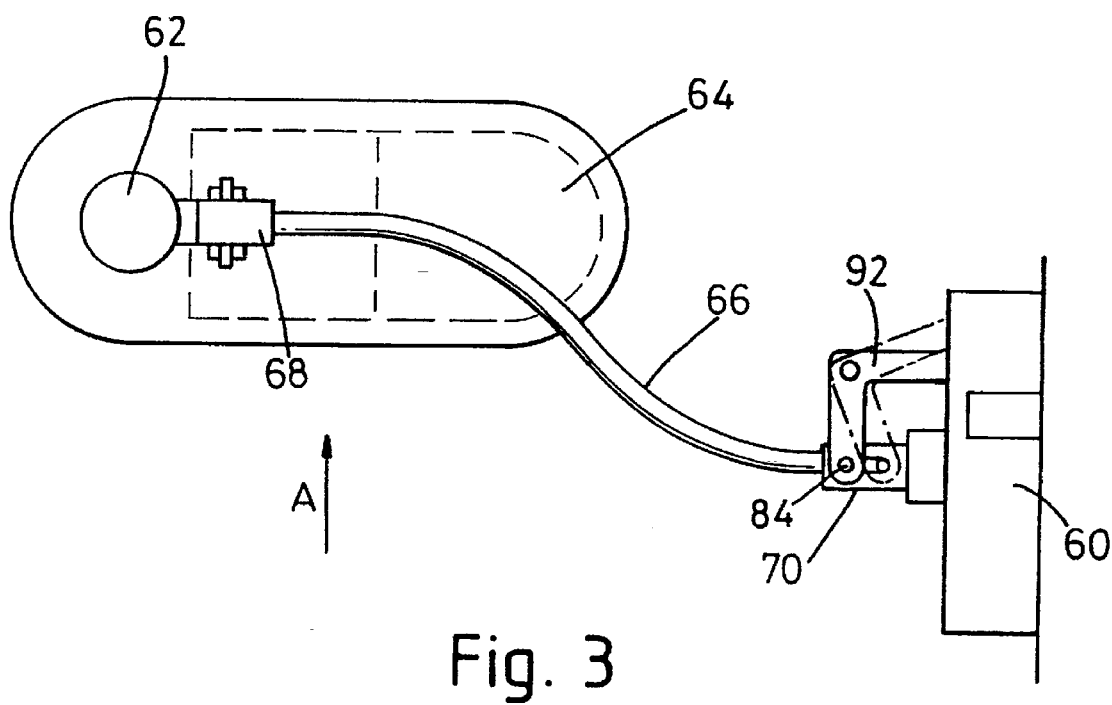
FIG. 3 is a view of a vehicle door securing system according to a second embodiment of the invention.
Figure 4:
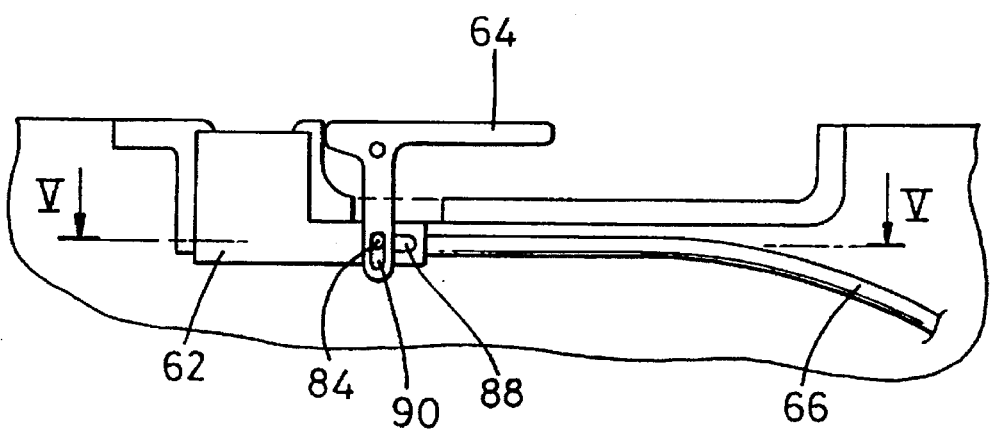
FIG. 4 is a view on arrow A of part of the system of FIG. 3.

Referring to FIGS. 3 and 4, in a second embodiment of the invention a vehicle securing mechanism in the form of a door latch 60 having release and locking functions is provided, and is operated by a key operated lock 62 and a door handle 64 via a single Bowden cable 66. At each end of the Bowden cable is a dual function cable linkage mechanism 68, 70. One of these 68 transfers movement of the door handle 64 to longitudinal movement of the inner 72 of the Bowden cable within the outer 74, and movement of the key in the lock 62 to rotational movement of the inner within the outer. The other 70 translates the longitudinal and rotational movement into release and locking actions in the latch 60.

Figure 5:
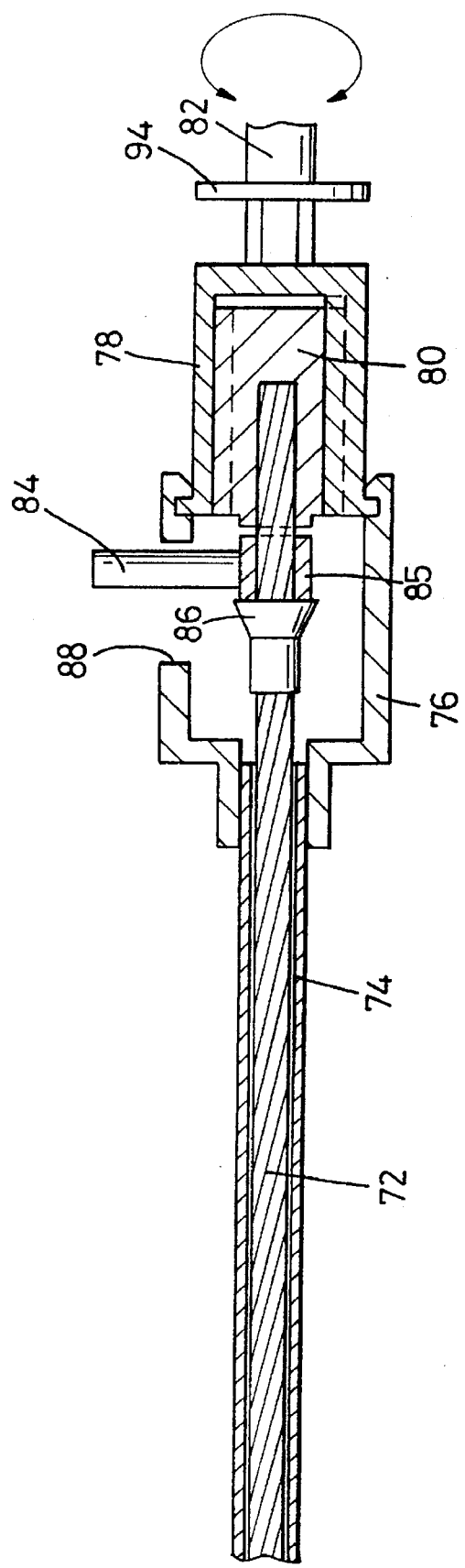
FIG. 5 is a section on line V—V through part of the system of FIG. 4.

Referring to FIG. 5, each dual action linkage mechanism 68, 70 comprises a main body 76 which supports the end of the cable outer 74, an internally splined drive cup 78, and an externally splined driven member 80 which is secured to the end of the cable inner 72. The drive cup 78 is rotatable relative to the main body 76 together with the driven member 80 and the cable inner 72, and has a rotary drive pin 82 projecting from it. A linear drive pin 84 is connected to the cable inner 72 by means of a sleeve 85 which allows the cable inner 72 to rotate relative to the linear drive pin 84. A stop 86 is attached to the cable inner 72 on the opposite side of the sleeve 85 to the driven member 80 thereby preventing movement of the sleeve along the cable inner 72. The linear drive pin 84 extends out of the main body 76 through a slot 88.

In the linkage mechanism 68 the rotary drive pin is rotated by the lock 62, which is similar to that shown in FIG. 2, but with the second bevelled gear 58 driving the rotary drive pin 82. The linear drive pin 84 extends through a slot 90 in the door handle 64 and is moved along the slot 88 in the main body 76 of by pulling and releasing the door handle.

In the linkage mechanism 70 the rotary drive pin 82 is connected to a locking member in the latch mechanism 60 so that rotation of the cable inner 72 causes locking of the vehicle door. The linear drive pin 84 is connected to a lever 92 which is rotated by longitudinal movement of the cable inner 72 to operate a latching function of the latch mechanism 60.

In a third embodiment of the invention, the system is similar to that of the second embodiment, except that the locking and latching operations are effected by means of an internal door handle, which operates in the same way as the external door handle 64, and a thumb wheel which is attached to the rotational drive pin 82, and which replaces the sill button conventionally used to operate vehicle door locks from inside the vehicle.

What is claimed is:

1. A securing system for a vehicle door, the system comprising a rotatable drive member adapted to be rotated by a user of the vehicle, a cable link comprising a cable outer and a cable inner having a longitudinal central axis, and first and second securing mechanisms for securing a door of the vehicle, wherein the cable inner is rotatable about said axis within the outer by movement of the rotatable drive member to operate the first securing mechanism and movable along said axis within the cable outer to operate said second mechanism.

2. A securing system according to claim 1 wherein the first securing mechanism comprises a locking mechanism.

3. A securing system according to claim 2 which includes a key operated lock, wherein the rotatable drive member forms part of said lock.

4. A securing system according to claim 3 wherein the rotatable drive member includes a first gear wheel, and the system further comprises a second gear wheel attached to the cable inner and engaged with the first gear wheel to be rotated by it.

5. A securing system according to claim 4 wherein the gear wheels are bevelled and have respective axes of rotation which are perpendicular to each other.

6. A securing system according to claim 1 wherein the rotatable drive member is arranged to be rotated directly by hand.

7. A securing system according to claim 6 wherein the rotatable drive member comprises a thumb wheel.

8. A securing system according to claim 1 wherein the rotatable drive member has splines thereon, and the system further comprises a splined sliding member which can slide relative to the drive member to allow the longitudinal movement of the cable inner.

9. A securing system according to claim 1 further comprising a longitudinal drive member which is rotatably attached to the cable inner.

10. A securing system according to claim 1 wherein one of the first and second securing mechanisms comprises a latch mechanism and the other comprises a lock mechanism.

11. A securing system according to claim 10 wherein the lock mechanism is arranged to lock the latch mechanism.

12. A securing system according to claim 10 wherein said first mechanism comprises a lock mechanism and the said second mechanism comprises a latch mechanism.

* * * * *